United States Patent [19]
Sato et al.

[11] 4,153,034
[45] May 8, 1979

[54] MAGNETO CASING

[75] Inventors: Masato Sato, Akashi; Keiichi Nakamizo, Hyogo, both of Japan

[73] Assignee: Kawasaki Jukogyo Kabushiki, Hyogo, Japan

[21] Appl. No.: 824,654

[22] Filed: Aug. 15, 1977

[30] Foreign Application Priority Data

Aug. 19, 1976 [JP] Japan .................................. 51-111514

[51] Int. Cl.² ............................................ F02B 77/00
[52] U.S. Cl. ............................ 123/198 E; 123/195 C
[58] Field of Search ........... 123/198 E, 198 R, 195 C, 123/195 S, 148 S, 149 R

[56] References Cited

U.S. PATENT DOCUMENTS

| | | | |
|---|---|---|---|
| 3,358,668 | 12/1967 | Post et al. ........................ | 123/198 E |
| 3,464,398 | 9/1969 | Scheiterlein et al. ............. | 123/198 E |
| 3,845,839 | 11/1974 | Eriksson .......................... | 123/198 E |
| 3,882,951 | 5/1975 | Conley ............................. | 123/198 E |
| 3,949,726 | 4/1976 | List ................................. | 123/198 E |

Primary Examiner—Ira S. Lazarus
Attorney, Agent, or Firm—Toren, McGeady and Stanger

[57] ABSTRACT

A magneto casing for an engine connected to an engine crankcase in liquidtight sealing relationship by means of an oil seal which permits small amounts of air to pass therethrough is formed therein with an air passage having mounted therein a filter which is repellent to water but permeable to air. When the internal pressure of the magneto casing undergoes changes due to variations in the pressure within the crankcase which occurs when the engine operates, only air is allowed to flow into and out of the magneto casing through the filter in the air passage and water is prevented from entering the magneto casing.

7 Claims, 4 Drawing Figures

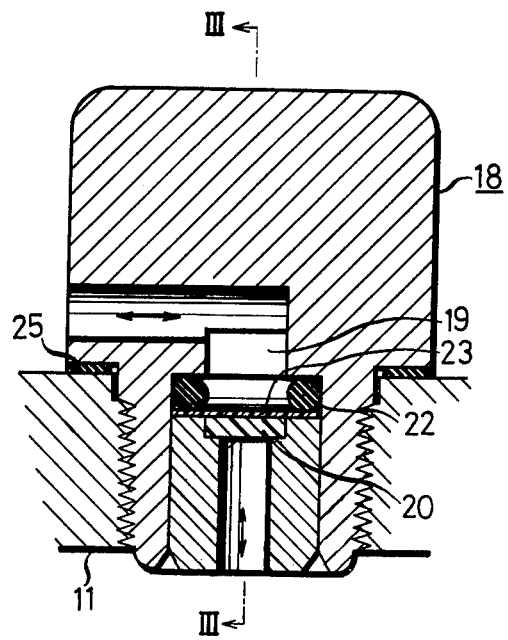
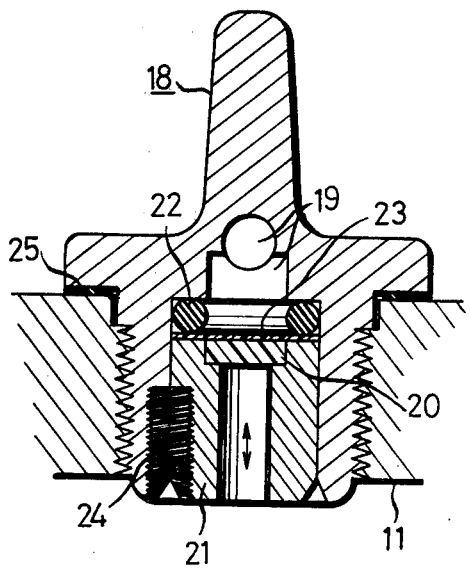
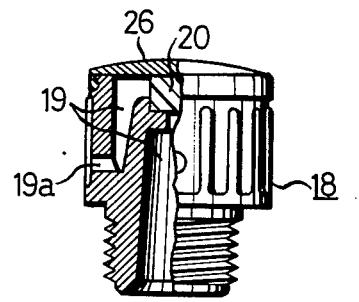

MAGNETO CASING

BACKGROUND OF THE INVENTION

This invention relates to a magneto casing of a sealed construction for an engine in which the internal pressure undergoes changes as if the magneto casing breathed as the engine operates.

In engines such as marine engines wherein large quantities of water tend to flow into the engine rooms, magneto casings are constructed in a manner to have a sealed construction for preventing the invasion of water so as to provide protection to the magneto against water. The magneto casings of the sealed construction of the prior art have encountered problems which are presently to be described.

Generally, the magneto is mounted on one end portion of the crankshaft which projects outwardly of the crankcase. Thus an oil seal is provided between the crankcase and the magneto casing for preventing leakage of oil from the crankcase side to the magneto casing side. The oil seal is effective to prevent leakage of oil but has no effect in cutting off the passage of air. Consequently, the internal pressure of the magneto casing undergoes changes as if the magneto casing breathed due to variations in the pressure in the crankcase and variations in the temperature in the magneto casing as the engine operates. Such changes in the internal pressure of the magneto casing are especially marked in the case of a two-cycle engine in which the crank chamber is sometimes subjected to a negative pressure of over 0.3 kg/cm$^2$ when compression and expansion strokes are repeated. This causes invasion of the magneto casing having a starter by water.

SUMMARY OF THE INVENTION

This invention relates to a magneto casing which is capable of preventing the invasion thereof by water while permitting air to pass into and out of the interior thereof without spoiling the water-proof function.

The outstanding characteristics of the present invention are that at least one air passage is formed in a magneto casing of a sealed construction for an engine in which the internal pressure undergoes changes as if the magneto casing breathed as the engine operates so as to communicate the interior of the magneto casing with atmosphere, and that an air-permeble but water-repellent filter is mounted in the air passage.

BRIEF DESCRIPTION OF THE DRAWINGS

FIG. 2 is a vertial sectional front view of the breather plug;

FIG. 3 is a sectional view taken along the line III—III of FIG. 2; and

FIG. 4 is a front view of a modification of the breather plug.

DESCRIPTION OF THE PREFERRED EMBODIMENTS

Figure 1:
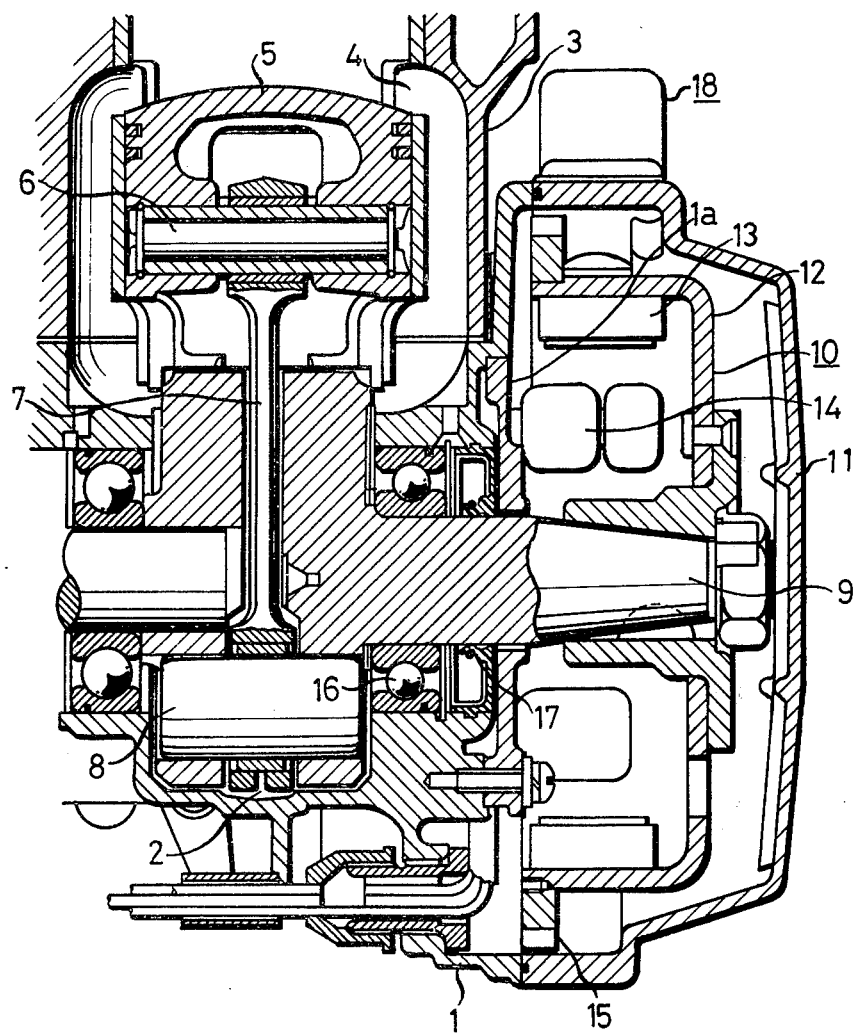
FIG. 1 is a vertical sectional front view of the engine in which one emodiment of the invention is incorporated.

Embodiments of the invention will be described with reference to the accompanying drawings wherein the invention is shown as being applied to a two-cycle engine. FIG. 1 shows an engine such as a marine engine in which water enters the engine room. The numeral 1 designates a crankcase, the numeral 2 a crank chamber, the numeral 3 a cylinder, the numeral 4 a scavenge air passage, the numeral 5 a piston, the numeral 6 a piston pin, the numeral 7 a connecting rod, the numeral 8 a crankpin, the numeral 9 a crankshaft, the numeral 10 a magneto, and the numeral 11 a magneto casing of a sealed construction which is connected to the crankcase 1.

The magneto 10 includes a flywheel 12 secured to one end portion of the crankshaft 9, magnets 13 mounted on an inner peripheral surface of the flywheel 12, and a coil 14 located on a base plate 1a of the crankcase 1. The numeral 15 refers to a driven gear for a starter mounted on an outer peripheral surface of the flywheel 12.

The crankshaft 9 is supported by a bearing 16, and an oil seal 17 is provided between the bearing 16 and the base plate 1a for preventing leakage of oil from the crank chamber 2 side.

A breather plug 18 is threadably connected to an upper end portion of the magneto casing 11 and formed herein with an air passage 19 (See FIGS. 2 and 3) for venting air from the interior of the magneto casing 11 to atmosphere, and a filter 20 is mounted in the air passage 19. The filter 20 is made of an air-permeable, water-repellent material such as a tetrafluorethylene resin (Teflon) which is known.

The filter 20 is mounted in the air passage 19 and, in the embodiment shown in FIGS. 2 and 3, it is mounted in a recess formed in an upper end of a holder 21 fitted in the breather plug 18 and an outer marginal portion thereof is prevented from moving upwardly by an air-permeable membrane 23 held between the holder 21 and an O-ring 22. The numeral 24 is a set-screw for the holder 21, the numeral 25 a sealing member interposed between the breather plug 18 and the magneto casing 11.

In the aforesaid construction, the contraction and expansion in the crank chamber 2 and changes in the temperature in the magneto casing due to the operation of the engine causes changes to occur in the internal pressure of the magnto casing 11 as if it breathed, because the oil seal 17 has not effect in cutting off the passage of air as stated above. As the internal pressure undergoes changes, air flows through the air passage 19 in the breather plug 18. More specifically, if the internal pressure of the magneto casing 11 is reduced when the crank chamber 2 expands or the temperature in the magneto casing 11 falls, then air is drawn by suction through the air passage 19 into the magneto casing 11. Conversely, if the internal pressure of the magneto casing 11 rises when the crank chamber 2 contracts or the temperature in the magneto casing 11 rises, then the air in the magneto casing 11 is vented to atmosphere through the air passage. In this way, the internal pressure of the magneto casing 11 can be maintained substantially at the same level as the atmospheric pressure.

If the external air drawn by suction into the magneto casing contains water, the water will be separated from the air by the water repelling action of the filter 20 in the air passage 19, so that the water is prevented from entering the magneto casing 11.

The breather plug 18 may be splashed with sea water. Thus if the air passage 19 is constructed in the form of an inverted letter L as shown in FIG. 2, the invasion of the magnet casing 11 by water can be effectively prevented.

FIG. 4 shows another embodiment of the invention in which the air passage 19 has an orifice 19a at its outer end which is located at a level lower than the filter 20. This arrangement exhibits better performance in preventing the invasion of the magneto casing 11 by sea water. That is, even if sea water enters the orifice 19a at the outer end of the air passage 19, it is almost impossible for the sea water to penetrate deep into the inner end of the air passage 19. Assuming that the sea water has succeeded in penetrating deep into the inner end of the air passage 19, the water can be discharged from the air passage 19 at once, so that the load applied to the filter 20 can be lessened. In the embodiment shown in FIG. 4, the filter 20 is mounted in an upper end portion of the breather plug 18 and its upward movement is prevented by a cap 26.

From the foregoing description, it will be appreciated that the present invention has the effect of preventing the invasion of the magneto casing by water, because the internal pressure of the magneto casing is maintained substantially at the level of the atmospheric pressure in conformity with changes in the internal pressure of the magneto casing which occur as if the magneto casing breathed. To accomplish this object, the interior of the magneto casing is maintained in communication with atmosphere through the air passage. However, the provision of the water-repellent filter in the air passage has the effect of preventing the magneto from being covered with water.

While the invention has been shown and described herein as being applied to a two-cycle engine, it will be apparent that the invention can have application in other types of engine such as a four-cycle engine with the same superb results. While particular embodiments of the invention have been shown and described, it will be understood that the particular details herein set forth are capable of modification and variation without departing from the principles of the invention and that the scope of the invention should be limited only by the scope and proper interpretation of the claims appended thereto.

What we claim is

1. A magneto casing of a sealed construction for an engine in which internal pressure undergoes changes as if the magneto casing breathed as the engine operates, wherein the improvement comprises:
   at least one air passage formed in the magneto casing for communicating the interior of the magneto casing with atmosphere; and a filter made of an air-permeable but water-repellent material mounted in said air passage.

2. A magneto casing as set forth in claim 1, wherein said air passage is formed in at least one breather plug fitted in the magneto casing.

3. A magneto casing as set forth in claim 1, wherein said air passage is formed in a breather plug fitted in the magneto casing, and said filter is mounted by a holder fitted in the breather plug.

4. A magneto casing as set forth in claim 1, wherein said air passage is formed in a breather plug fitted in the magneto casing, and said filter is mounted by a holder fitted in the breather plug and formed with a air passage.

5. A magneto casing as set forth in claim 1, wherein said air passage is formed in a breather plug fitted in the magneto casing, and said filter is mounted by a holder fitted in the breather plug and formed with an air passage, said filter being held in place by an air-permeable membrane mounted in said holder.

6. A magneto casing as set forth in claim 1, wherein said air passage is formed in at least one breather plug fitted in said magneto casing, said breather plug is located in an upper portion of the magneto casing, and the air passage formed in the breather plug has a cross-sectional shape of an inverted letter L so as to minimize the quantity of water entering the magneto casing through the air passage.

7. A magneto casing as set forth in claim 1, wherein said air passage is formed in at least one breather plug fitted in the magneto casing, said breather plug is located in an upper portion of the magneto casing, and the air passage has an orifice at its outer end which is located in a position lower than the position of the filter in the air passage so as to thereby minimize the quantity of water entering the magneto casing through the air passage.

* * * * *